(12) United States Patent
Lebacher et al.

(10) Patent No.: US 12,517,012 B2
(45) Date of Patent: Jan. 6, 2026

(54) METHOD FOR PROVIDING A PHYSICALLY EXPLAINABLE FAULT INFORMATION OF A BEARING BY A FAULT DETECTION MODEL

(71) Applicant: Siemens Aktiengesellschaft, Munich (DE)

(72) Inventors: Michael Lebacher, Töging am Inn (DE); Timo Rieskamp, Munich (DE); Thomas Decker, Unterschleißheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 19/099,587

(22) PCT Filed: Aug. 1, 2023

(86) PCT No.: PCT/EP2023/071311
§ 371 (c)(1),
(2) Date: Jan. 29, 2025

(87) PCT Pub. No.: WO2024/033161
PCT Pub. Date: Feb. 15, 2024

(65) Prior Publication Data
US 2025/0258061 A1 Aug. 14, 2025

(30) Foreign Application Priority Data
Aug. 9, 2022 (EP) .................................... 22189450

(51) Int. Cl.
*G01M 13/045* (2019.01)
*G05B 23/02* (2006.01)
(Continued)

(52) U.S. Cl.
CPC ....... *G01M 13/045* (2013.01); *G05B 23/0281* (2013.01); *G06F 18/2131* (2023.01); *G06N 5/045* (2013.01)

(58) Field of Classification Search
CPC ............ G01M 13/045; G05B 23/0281; G06F 18/2131; G06N 5/045
See application file for complete search history.

(56) References Cited

U.S. PATENT DOCUMENTS

| 2021/0356361 A1 | 11/2021 | Kenny et al. |
| 2022/0099527 A1 | 3/2022 | Cheng et al. |

FOREIGN PATENT DOCUMENTS

| CA | 3120154 A | 11/2021 |
| CN | 113177448 A | 7/2021 |

(Continued)

OTHER PUBLICATIONS

Chen et al., "Vibration Signals Analysis by Explainable Artificial Intelligence (XAI) Approach: Application on Bearing Faults Diagnosis" IEEE Access vol. 8, 2020 (Year: 2020).*

(Continued)

*Primary Examiner* — John C Kuan
(74) *Attorney, Agent, or Firm* — Schmeiser, Olsen & Watts, LLP

(57) ABSTRACT

A fault detection apparatus and computer-implemented method for providing physically explainable fault information of a bearing built in a machine by a fault detection model is provided, including: obtaining sensor data measured at the bearing as input data relating to an input data domain and the fault detection model, mapping the measured sensor data from the input data domain to a selected data domain resulting in an augmented fault detection model which outputs augmented predicted failure value related to the selected data domain, wherein the selected data domain has a physical meaning to the fault of the bearing, perform- (Continued)

Figure 1:
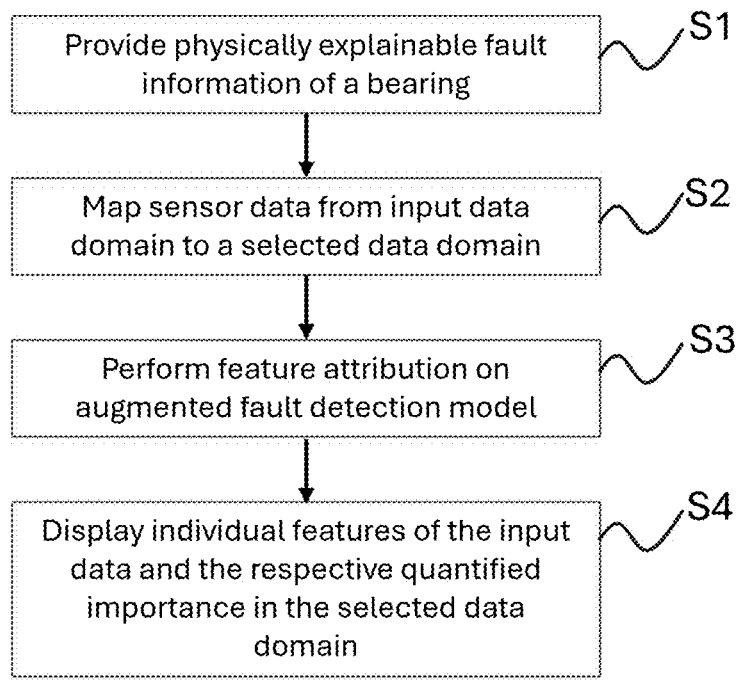

ing a feature attribution on the augmented fault detection model quantifying an importance of at least one individual feature to the augmented failure value related to the selected data domain, and displaying the individual feature and the respective quantified importance in the selected data domain at a user interface.

17 Claims, 5 Drawing Sheets

(51) Int. Cl.
    *G06F 18/2131*    (2023.01)
    *G06N 5/045*     (2023.01)

(56) References Cited

FOREIGN PATENT DOCUMENTS

| | | |
|---|---|---|
| CN | 114323647 A | 4/2022 |
| CN | 114372492 A | 4/2022 |
| CN | 114577470 A | 6/2022 |

OTHER PUBLICATIONS

Kim et al., "An Explainable Neural Network for Fault Diagnosis With a Frequency Activation Map" IEEE Access vol. 9, 2021 (Year: 2021).*

Mey et al., "Explainable AI Algorithms for Vibration Data-based Fault Detection: Use Case-adadpted Methods and Critical Evaluation" Springer Nature 2021 (Year: 2021).*

Yeo Guo Feng Anders et al: "A Simple Framework for XAI Comparisons with a Case Study", 2022 5th International Conference on Artificial Intelligence and Big Data (ICAIBD), IEEE, May 27, 2022 (May 27, 2022), pp. 501-508, XP034148440.

Brito, Lucas Costa et al: "An Explainable Artificial Intelligence Approach for Unsupervised Fault Detection and Diagnosis in Rotating Machinery", arxiv.org, Cornell University Library, 201 Olin Library Cornell University Ithaca, NY 14853, Feb. 23, 2021 (Feb. 23, 2021), XP081891018.

PCT International Search Report and Written Opinion of International Searching Authority mailed Nov. 10, 2023 corresponding to PCT International Application No. PCT/E P2023/071311 filed Aug. 1, 2023.

* cited by examiner

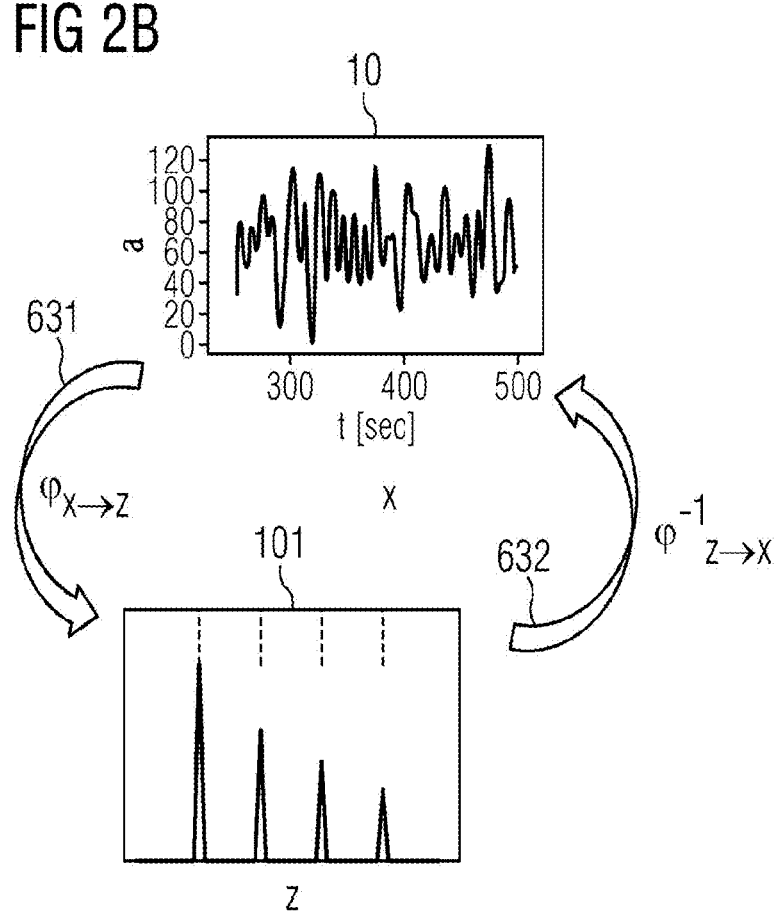

METHOD FOR PROVIDING A PHYSICALLY EXPLAINABLE FAULT INFORMATION OF A BEARING BY A FAULT DETECTION MODEL

CROSS-REFERENCE TO RELATED APPLICATIONS

This application is a national stage of PCT Application No. PCT/EP2023/071311, having a filing date of Aug. 1, 2023, which claims priority to EP Application Serial No. 22189450.4, having a filing date of Aug. 9, 2022, the entire contents both of which are hereby incorporated by reference.

FIELD OF TECHNOLOGY

The following relates to a fault detection apparatus and a computer-implemented method for providing physically explainable fault information of a bearing built in a machine by a fault detection model.

BACKGROUND

Sensors are omnipresent in all kinds of heavy machinery, motors, and similar equipment. One especially important application field of sensors is detecting faults of bearings in rotating machinery such as motors, turbines, and pumps etc. Faults in bearings are among the most common causes of malfunction for rotating equipment. This malfunction can be detected in vibration patterns. To obtain the required information, sensors such as position transducers, velocity sensors, accelerometers and spectral emitted energy sensors can be installed either directly on the bearings or mounted on these machines. This allows to obtain measurements that can be used for vibration analysis by extracting vibration frequencies and amplitudes. If the bearings are subject to different damages, geometrical imperfections or malfunction, the sensor values typically represent suspicious patterns and anomalies. While there exist multiple tools and methods derived from physical theory that would allow, in principle, to obtain this information from the sensor measurements, this is still a very challenging task.

However, there are multiple problems related to detecting faults in bearings from sensor data that still need to be solved. Since time series of sensor data are only indirect measurements of real physical mechanisms and have a very complex data structure, machine learning model trained to detect faults in bearings need to be complex themselves and are, therefore, often not human-understandable, often called black-box algorithms. This means that it is not possible to understand how the model behaves, why the model predicts faults of the bearing and consequently whether the results of the algorithm are in line with physical reasoning. This leads to obstacles for data scientists/model developers to build a better and more robust model and to obstacles for domain experts, like Engineers or operation personal to understand and trust the results of the model. It also leads to problems with the detection of root-causes for faults in the bearing, e.g., the bearing or crankshaft faults and consequently to a lack of acceptance from user side.

Signal processing approaches for detecting faults on bearings are standard in application and well-grounded in theory. Identified faults in a bearing may occur at different parts of the bearing. In a bearing, faults can occur either in the bearings outer race, in the inner race, in the cage or at balls of a ball bearing. Different approaches and formulas are necessary to describe the physical relationship between measured sensor data and the individual type of fault. Since these formulas often describe the damage frequency for the different kinds of damage types of the bearing based on the attributes and the rotation speed of the bearing, the different phenomena can be physically explained. To perform fault diagnosis of these different damages on acceleration data, it is important to know these physical attributes of the bearing as well as the rotation speed the bearing was running at when the data was recorded. Since some of the fault effects are amplitude modulated in the vibration spectrum and overlaid by resonance effects, different pre-processing steps are applied to the recorded raw data to reveal the specific fault frequencies.

However, the signal processing approaches often suffer from a couple of problems. For example, a resulting vibration spectrum highly depends on the mounting position of a speed sensors and a possible load of the machine. Further, noisy sensor signals with multiple confounding factors impede the signal-processing.

Also, machine learning approaches have been considered to perform fault detection in bearings. In order to perform the training of the machine learning algorithm, it is necessary to have access to a sufficient amount of ideally labeled training data containing realistic vibration signals measured during actual operation of the machine of interest with healthy and defective parts. Nevertheless, such algorithms are inherently very complex black box models. This means that it is entirely unclear based on which logic such methods form their decision.

SUMMARY

An aspect relates to an apparatus and method for fault detection of rolling objects by machine learning methods which outputs physically interpretable information, which even indicate root-causes for a detected fault. A further specific aspect is to improve the interpretability of bearing fault detection with machine learning algorithms trained on either vibration or electric current data of rotating machines.

A first aspect concerns a computer-implemented method for providing physically explainable fault information of a bearing built in a machine by a fault detection model, comprising the steps:

obtaining sensor data measured at the bearing as input data relating to an input data domain and a fault detection model which is already trained on sensor data related to the input data domain to output a predicted failure value of the bearing by processing the obtained sensor data, mapping the measured sensor data from the input data domain to a selected data domain and resulting in an augmented fault detection model which outputs augmented predicted failure value related to the selected data domain instead of the input data domain, wherein the selected data domain has a physical meaning to the bearing's fault, performing a feature attribution on the augmented fault detection model for the obtained sensor data, quantifying the importance of at least one individual feature of the input data to the augmented failure value related to the selected data domain, and displaying the individual feature and the respective quantified importance in the selected data domain at a user interface.

In embodiments, the method is based on a "conventional" fault detection model relating input signals of sensor data measured, e.g., over time, to a predicted failure value, e.g., whether a fault is present (value 1) or not (value 0). A feature attribution applied to the predicted failure value would provide data points in the input data domain, e.g., in the time domain. The data feature comprises at least one but mostly several adjacent sensor data points. These data features in the input domain would not provide information about the underlying specific fault. The quantified data features in the input data domain provide neither a hint to the root-cause for the predicted failure value nor is it interpretable in a way that is in line with accepted physical theory. In contrast to that, the feature attribution performed on the augmented fault detection model, which is related to the selected data domain, provides features in the selected data domain instead of features in the input data domain. The augmented predicted failure value resulting from the augmented fault detection model is equivalent to, especially even the same as, the predicted failure value resulting from the obtained fault detection model. The selected data domain has a physical meaning to the fault of the bearing and is therefore interpretable, e.g., comparable with typical fault frequencies of the considered bearing.

In an embodiment of the method, the domain mapping consists of multiple concatenated domain mappings.

Such concatenated domain mappings can model/reflect different domain transitions and provide therefore more flexibility with respect to faults being physically explainable in another domain as the input data domain, in which the fault detection model was trained on.

In an embodiment of the method, the at least one domain mapping is performed by applying an invertible, bijective transformation function onto the measured input data.

This ensures a unique and unambiguous mapping between the output of the fault detection model in the input data domain (i.e., the predicted failure value) and the output of the augmented fault model (i.e., the augmented failure value) in the selected data domain. The predicted failure value and the augmented predicted failure value are equivalent, i.e., they have the same value.

In an embodiment of the method, the feature attribution is performed by any model agnostic feature attribution method applicable to a type of machine learning model which is used for the fault detection model.

This ensures that the data features which are most relevant to the output of the augmented fault detection model can be analysed independently on the augmented learning model, and only dependent on the "original" fault detection model.

In an embodiment of the method, the fault detection model is a deep neural network, especially am Autoencoder, a Convolutional Neural Network or a Deep Belief Network.

Deep neural networks can learn extreme complicated patterns, they are flexible and able to cope with high-dimensional complex sensor input data.

In an embodiment of the method, the sensor data is vibration data or electric current data measured at or near the bearing.

Vibration data are especially indicative to fault indications of bearings, as defects in the bearing produce cyclic interruptions due to imperfections of e.g., balls. The machine with the defective bearing often requires more electrical current than in un-defective state.

In an embodiment of the method, the sensor data measured at the bearing are measured in the time domain and the mapping is performed into a frequency domain.

Sensors mainly measure a physical parameter of the machine over time and are therefore in most cases available in time domain. As faults of bearings result in cyclic appearing disturbances in sensor data measured over time, the frequency domain of the signal envelope is the most likely domain where a physical interpretation seems possible.

In an embodiment of the method, an alarm is automatically output to the user interface, if the quantified importance of the augmented fault detection model is detected at a predefined frequency, which is related to a root cause of a fault of the bearing.

The alarm attracts the attention of an operation personnel in such cases indicating a fault of the bearing with high probability. This allows to take fast measures at the machine, e.g., change settings, stop the machine, or schedule maintenance work.

In an embodiment of the method, the output quantified importance is displayed in a color-code with respect to quantity.

This facilitates recognizing critical or high relevant values, e.g., in a continuous spectrum of importance values. The color-code may indicate different values of quantity in different colors of a predefined color scale or in different intensity of one color.

In an embodiment of the method, the fault detection model of a bearing is trained on a signal envelope of the measured sensor data in a time domain and analyzed for specific fault frequencies in the frequency domain.

The signal envelope highlights the time distance between two peaks in the sensor data measured in the time domain. Characteristic faults of the bearing depend on parameters like the diameter of the balls or a pitch diameter of the bearing, and produce disturbances in different intervals of time, which relate directly to frequencies depending on the value of above parameters.

In an embodiment of the method, the domain mapping is performed by a Fourier transformation function.

Fourier Transformation or a Fast Fourier Transformation function are well known and require few processing capacities.

In an embodiment of the method, the machine is a rotating machine, especially a motor, a turbine, a pump, or a press.

A further aspect concerns a fault detection apparatus for providing physically explainable fault information of a bearing built in a machine by a fault detection model, comprising at least one processor configured to perform the steps:

- obtaining sensor data measured at the bearing as input data relating to an input data domain and a fault detection model which is trained on sensor data related to the input data domain to output a predicted failure value of the bearing by processing the obtained sensor data,
- mapping the measured sensor data from the input data domain to a selected data domain resulting in an augmented fault detection model which outputs augmented predicted failure value related to the selected data domain, wherein the selected data domain has a physical meaning to the fault of the bearing,
- performing a feature attribution on the augmented fault detection model for the obtained sensor data, quantifying an importance of at least one individual feature of the input data to the augmented failure value related to the selected data domain, and
- displaying the individual feature and the respective quantified importance in the selected data domain at a user interface.

A further aspect concerns a computer program product (non-transitory computer readable storage medium having instructions, which when executed by a processor, perform actions) directly loadable into the internal memory of a digital computer, comprising software code portions for performing the steps as described before, when the product is run on the digital computer.

BRIEF DESCRIPTION

Figure 2:
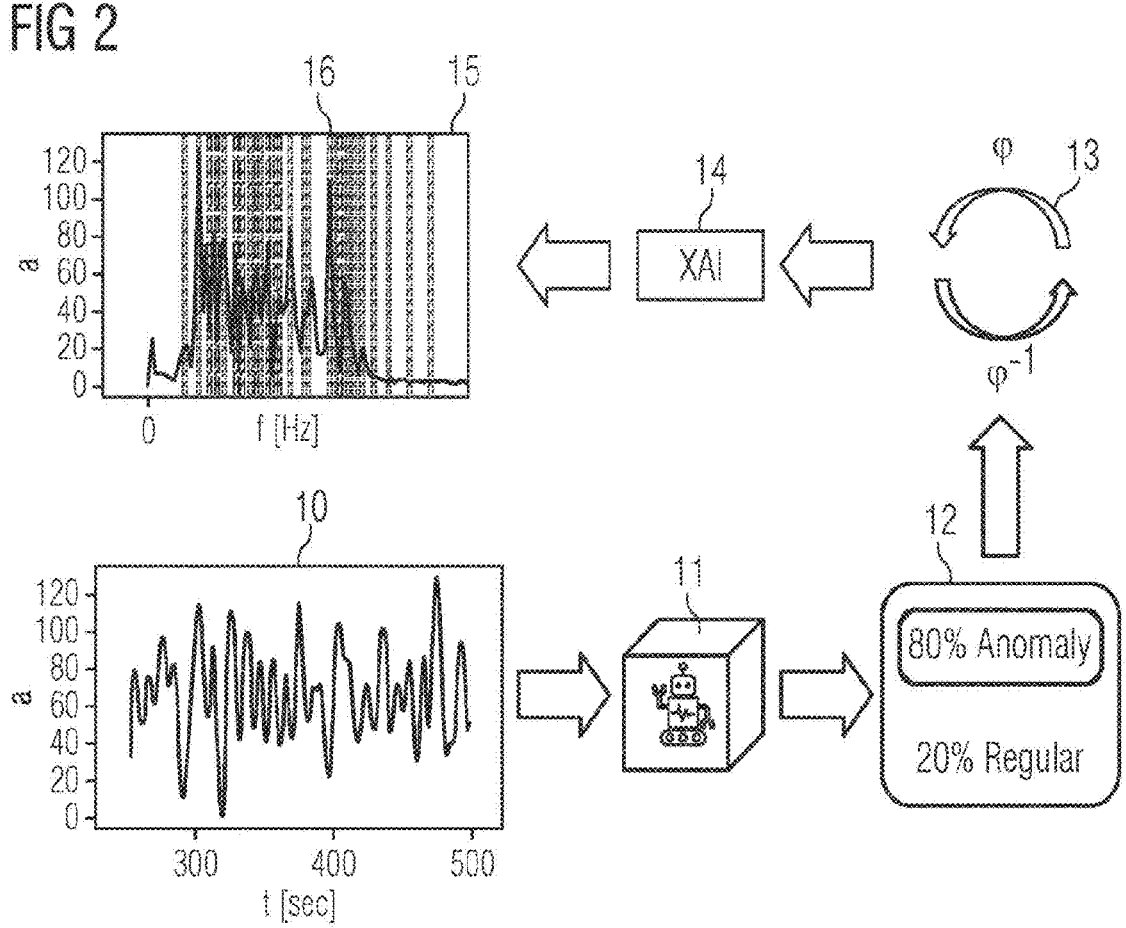
Figure 2A:
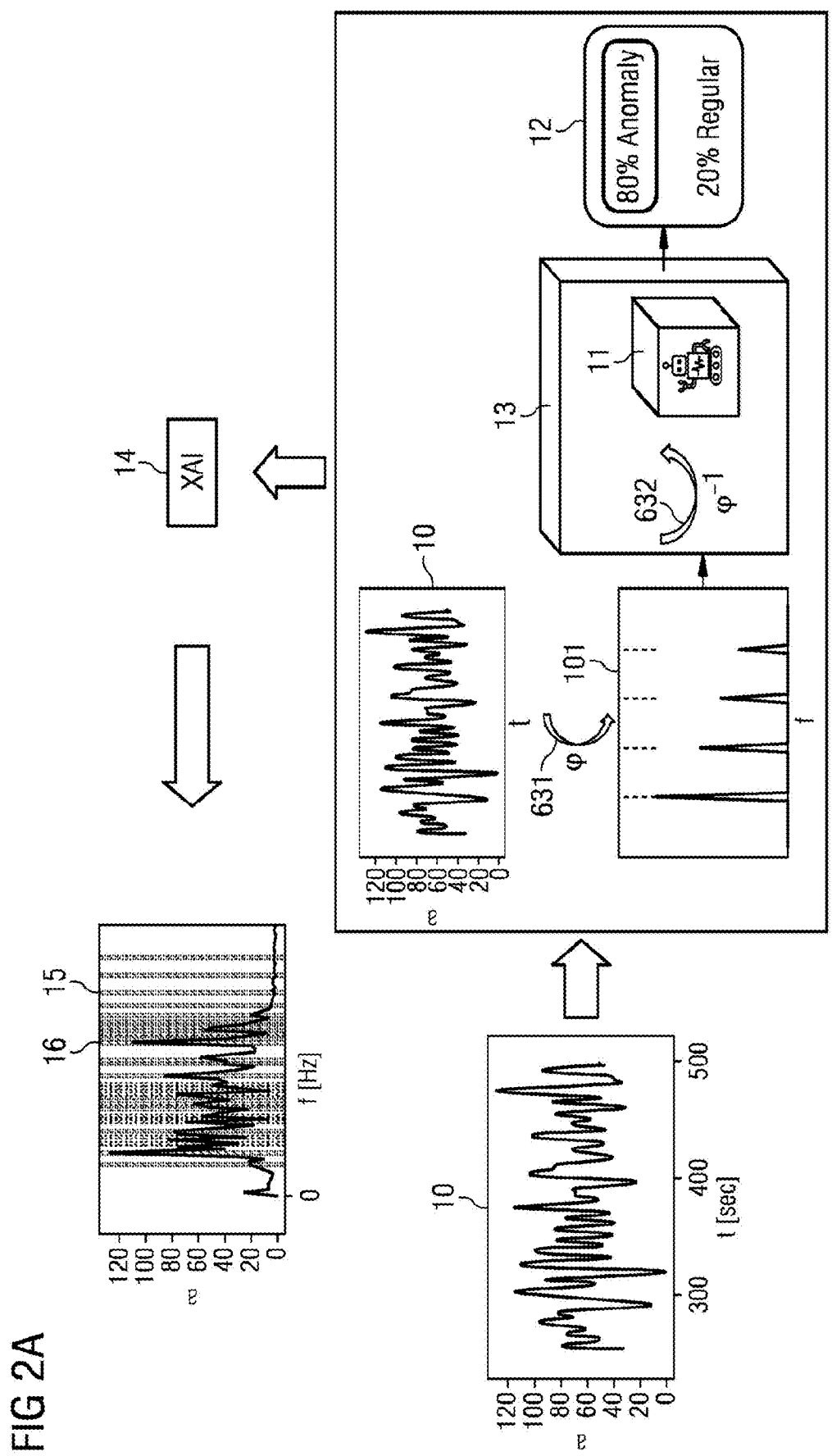
Figure 3A:
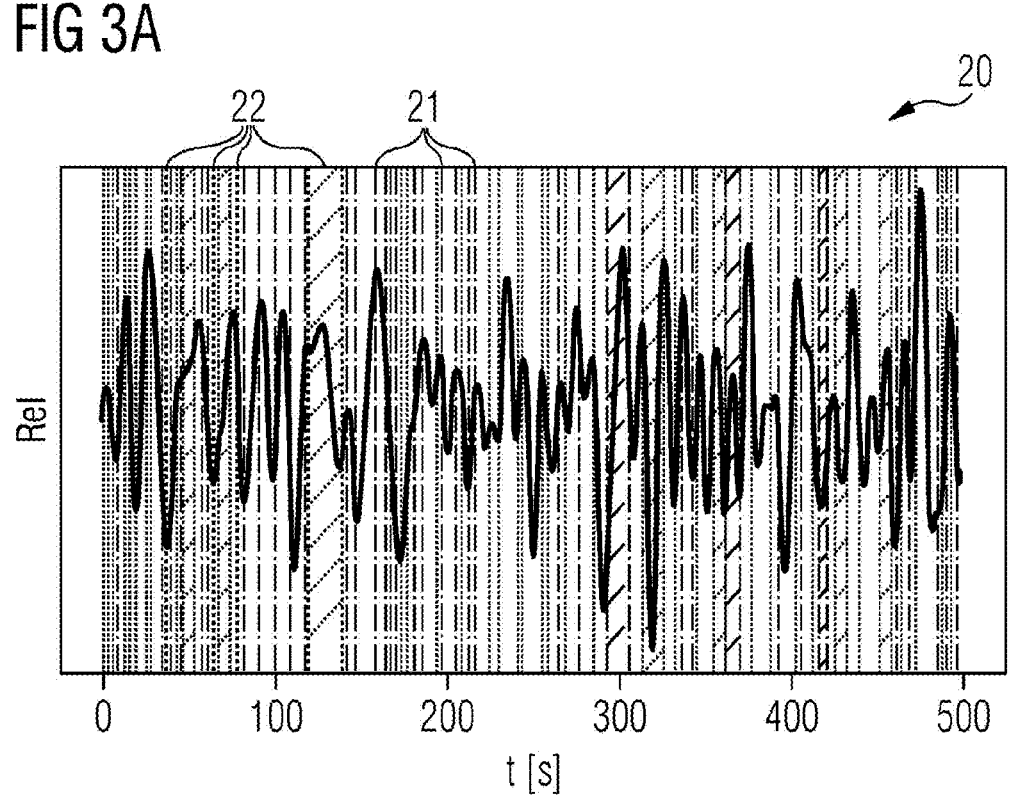
Figure 3B:
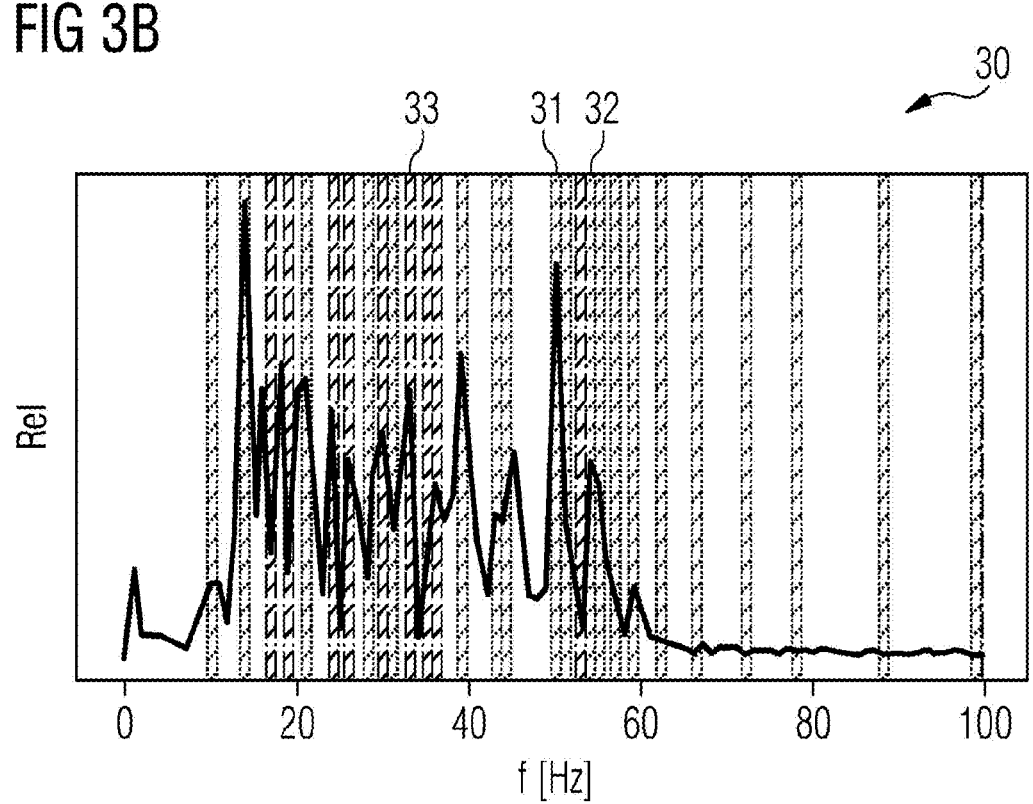
Figure 4:
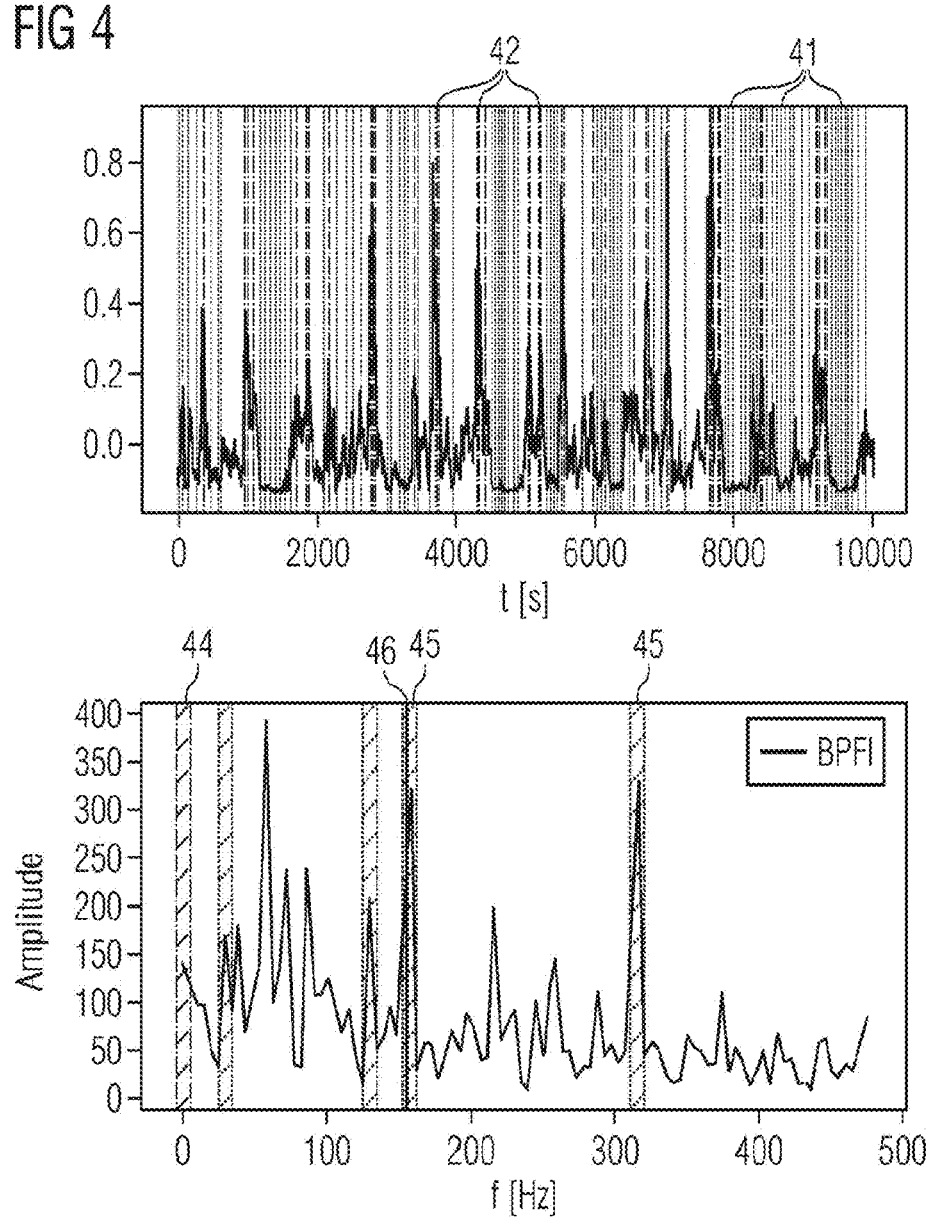
Figure 5:
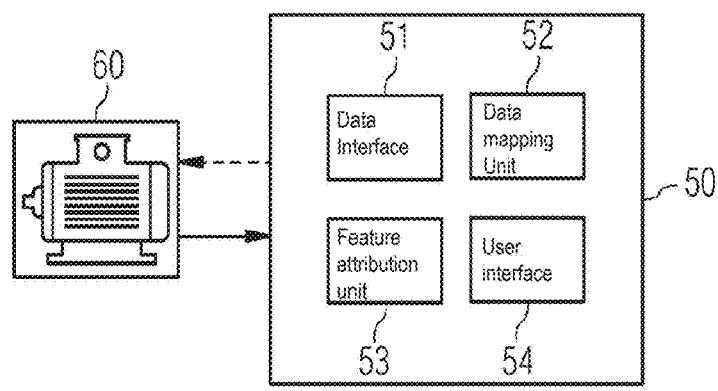

Some of the embodiments will be described in detail, with references to the following Figures, wherein like designations denote like members, wherein:

FIG. 1 illustrates an embodiment of the inventive computer-implemented method by a flow diagram;

FIG. 2 schematically illustrates in more detail an interaction of the various processing steps;

FIG. 2A schematically illustrates a domain mapping and resulting augmented fault detection model;

FIG. 2B schematically illustrates characteristics of a transformation function applied for the domain mapping;

FIG. 3A schematically illustrates an output of a fault detection model in the input domain;

FIG. 3B schematically illustrates an output of an embodiment of the augmented fault detection model in the selected domain;

FIG. 4 schematically illustrates an output of feature attribution of the fault detection model in the input domain compared with the output of feature attribution of the augmented fault detection model in the selected domain; and FIG. 5 illustrates an embodiment of the inventive fault detection apparatus as a block diagram.

DETAILED DESCRIPTION

The drawings are intended to illustrate functions and the co-operation of components. Here, it is to be understood that any connection or coupling of functional units, devices, components or other physical or functional elements could also be implemented by a direct connection or an indirect connection coupling element, e.g., via one or more intermediate elements. A connection or a coupling of entities or components can for example be implemented by a wire-based, a wireless connection and/or a combination of a wire-based and a wireless connection. Functional units can be implemented by dedicated hardware, e.g., processor, firmware or by software, and/or by a combination of dedicated hardware and firmware and software. It is further noted that each functional unit described for an apparatus can perform a functional step of the related method and vice versa.

First, a description of standard approaches toward detecting bearing faults is provided, that are standard in application and well-grounded in theory. However, they often suffer from a range of problems. Examples are (too) noisy raw signals of sensor data, multiple confounding factors. These standard approaches suffer of being inflexible and not able to cope with high-dimensional complex sensor data. As this approach is based on a physical derivation of the bearing behaviour during fault conditions it is described in detail below.

Localized faults in a bearing may, especially a rolling element bearing, occur at different parts of the bearing, either in the bearings outer race, in the inner race, in the cage or at a rolling element. Depending on the fault, different approaches are necessary. For the formulars below, we will use the following notation: d is the bearings ball diameter, D is pitch diameter, $f_r$ is the shaft speed, n is the number of rolling elements and φ is the bearing contact angle.

An inner ring damage is caused by irregularities on the inner ring of a bearing. When the rolling elements strike this fault, a shock is introduced that emits high frequency resonance. The envelope spectrum shows this fault at the BFPI frequencies:

$$BPFI = \frac{nf_r}{2}\left(1 + \frac{d}{D}\cos(\Phi)\right)$$

An outer ring damage is caused by irregularities on the outer ring of a bearing. The envelope spectrum shows this fault at the BFPI frequencies:

$$BPFO = \frac{nf_r}{2}\left(1 - \frac{d}{D}\cos(\Phi)\right)$$

Wear or deformation will cause the cage to move from its centric position. Unbalance forces occur which lead to shock pulses.

$$FTF = \frac{f_r}{2}\left(1 - \frac{d}{D}\cos(\Phi)\right)$$

Damaged rolling elements periodically touch the bearings inner ring and outer ring and generate shock signals. Since the rolling elements rotate around themselves and at the same time experience a relative movement through the cage, sidebands are to be expected. The envelope spectrum shows peaks at:

$$BSF = \frac{D}{2d}\left[1 - \left(\frac{d}{D}\cos(\Phi)\right)^2\right]$$

Since these formulas describe the damage frequency for the different kinds of bearing damage types based on the bearing physical attributes and the rotation speed, the different phenomena can be physically explained. To perform fault diagnosis of these different bearing damages on acceleration data, it is important to know these physical attributes of the bearing as well as the rotation speed the bearing was running at when the data was recorded.

Since some of the fault effects are amplitude modulated in the vibration spectrum and overlaid by resonance effects, different pre-processing steps are applied to the recorded raw data to reveal the specific fault frequencies. It should be noted that a resulting vibration spectrum highly depends on the mounting position of a speed sensors and possible load of the machine.

A signal processing-based approach applies a bandpass filter to the acceleration signal that contains the running noise of the bearing. Afterwards the envelope signal of the prefiltered signal is computed and is transferred to the frequency domain.

By calculating the envelope, the amplitude-modulated damage fault signal can be de-modulated, and the resulting envelope spectrum shows the different bearing faults in form of a peak at the characteristic frequencies BPFI, BPFO, FTF and BSF as defined above.

A common way of obtaining the envelope spectrum is to calculate the analytical signal and then transfer it to the frequency domain. Since strong background noise such as impulse electromagnetic noise and periodic harmonic noise generated by shaft rotation etc. has great influence on the selection of the resonance frequency band, the right choice of an appropriate cut-off frequency for the upper- and the lower bound and the centre frequency of the bandpass filter is important.

In order to achieve this, the frequency band with the highest signal-to-noise ratio is determined by computing a kurtogram. The kurtogram shows a spectral kurtosis for different window widths and centre frequencies. Kurtosis is a measure of the "tailedness" of the probability distribution of a real-valued random variable.

$$Kurt = E\left[\left(\frac{X-\mu}{\sigma}\right)^4\right] = \frac{E[(X-\mu)^4]}{(E[(X-\mu)^2])^2}$$

Due to the fourth power, impulsive deviations from the mean result in large kurtosis values.

Selecting the center frequency and bandwidth from the kurtogram with the highest kurtosis value is a promising choice for the applied bandpass filter. As described above, this approach requires detailed knowledge about the installed bearing and a high manual effort of a domain expert. An embodiment of the inventive method is described in the following with respect to FIG. 1 and explained in more detail with respect to FIG. 2 and FIGS. 3A/B.

A first step S1, see FIG. 1, to provide a physically explainable fault information of a bearing built in a machine is to obtain sensor data 10, see FIG. 2, measured at the bearing as input data relating to an input data domain and a fault detection model 11 which is trained on sensor data related to the input data domain. In an embodiment, the sensor data 10 is vibration data or electric current data measured at or near the bearing. The sensor data 10 measured at the bearing are measured in the time domain. The output of the fault detection model 11 is a predicted failure value 12 of the bearing by processing the obtained sensor data 10.

The measured sensor data 10 are mapped from the input data domain to a selected data domain resulting in an augmented fault detection model which outputs augmented predicted failure value related to the selected data domain, see step S2. The selected data domain has a physical meaning to the fault of the bearing and is therefore a semantic representation of the sensor data. For monitoring bearings, the mapping is performed from time as input data domain into a frequency as the selected data domain. In FIG. 2 the mapping and the resulting augmented fault detection model is depicted by reference sign 13.

A feature attribution 14 is performed on the augmented fault detection model 13 quantifying the importance of at least one individual feature of the input data in the selected data domain to the augmented failure value, wherein the augmented failure value is equivalent or even the same as the failure value of the obtained fault detection model, see step S3. The feature attribution is performed by any model agnostic feature attribution method applicable to the fault detection model.

In a last step S4, the individual features of the input data and the respective quantified importance in the selected data domain are displayed at a user interface. FIG. 2 shows an example of the displayed output as a diagram 15. The color of a vertical line 16 indicates the value of the importance of this frequency feature for the predicted failure value output by the fault detection model. The frequency feature is a dedicated frequency or a frequency band comprising of several subsequent frequencies which contribute jointly to the indicated importance. Based on a predefined critical value in the selected data domain which is related to a root cause of the bearing an alarm is automatically output to the user interface if the quantified importance of the augmented fault detection model is detected at the predefined critical value.

In an embodiment, the output quantified importance is displayed in a color-code with respect to quantity.

FIG. 2A and FIG. 2B show the domain mapping and the resulting augmented fault detection model 13 in more detail. The domain mapping is performed by applying a transformation function j, 631 onto the measured sensor data 10 and by applying an inverse form of the transformation function $j^{-1}$, 632 onto the fault detection model 11. Thus, obtained sensor data 10 relating to the input data domain t are transferred to the sensor data 101 in the selected data domain f. The inverse form of the transformation function $j^{-1}$, 632) applied onto the fault detection model 11 results in the augmented fault detection function 13. Thus, the obtained sensor data 10 mapped into the selected data domain are input into the augmented fault detection model 13 which outputs the augmented fault value 12. The input data in the selected data domain, the augmented fault detection model 13 and the augmented fault value 12 are input to the feature attribution 14. The feature attribution 14 outputs a quantification of the importance of features in the obtained sensor data 101 in the selected data domain.

FIG. 2B shows the transformation function j, 631 in more detail. The transformation function j, 631 is an invertible, bijective transformation function. This means that the transformation function j, 631 applied to obtained sensor data 100 in the input data domain x outputs in sensor data 101 in the selected data domain z. On the other side, the inverse form of the transformation function $j^{-1}$, 632 applied to sensor data 101 in the selected data domain z outputs in sensor data 100 in the input data domain x. The input data domain x can be any parameter, e.g., time t as shown in FIG. 2A. The selected data domain z can be any parameter, e.g., frequency as shown in FIG. 2A.

In many operational cases the sensor data are measured over time. Typically, one or several sensors detect vibration of the bearing in terms of an acceleration of the whole bearing or parts of the bearing. Another parameter measured to derive defects of a bearing is an electric current data of the machine. The sensors are usually located at a part of the machine close to the bearing. The obtained sensor data 10 shown in FIG. 2 provide acceleration values a measured over time t. The time is the input data domain.

The machine learning model for fault detection, i.e., the fault detection model 11 can be considered as a function $f_\Theta$: $R^N \to \{0,1\}$ mapping input sensor data 10 to an output providing a predicted failure value, e.g., a decision whether a fault is present (value 1) or not (value 0). The fault detection model was trained by a sufficient amount of ideally labeled training data containing realistic sensor data, e.g., vibration signals measured in the input data domain, e.g., over time, during actual operation of the machine of interest with healthy and defective parts.

The fault detection model 11 is a deep neural network, especially an Autoencoder, a Convolutional Neural Network or a Deep Belief Network which is able to learn extreme complicated patterns. Most approaches utilizing deep neural networks show good performance on test data, are flexible and able to cope with high-dimensional complex sensor data and are reliable regarding their predictions. Nevertheless, such models are inherently very complex black box models.

This means that it is entirely unclear based on which logic such models form their decision.

An approach to explain black box machine learning models is given by feature attribution methods. Such methods quantify to which extend individual input data features have contributed to the final predicted failure value of the model. The input data feature comprises one or several adjacent datapoints of the input data. A decision of a machine learning model, i.e., the predicted failure value, can be considered as a function $f: R^d \to R$ mapping d-dimensional sensor data $x \in R^d$ to a real number $f(x)$ expressing a predicted model decision. In case of a fault detection of a bearing, $f(x)$ could for example indicate a logit value or a respective probability for the presence of a defect estimated by the fault detection model. The goal of feature attribution is to identify an importance vector $\phi \in R^d$ such that $\phi_i$ quantifies the importance that each input feature $x_i$ had on the model prediction $f(x)$ for fixed input x.

Up to now, any such feature attribution method will retrieve feature attributions in units of the sensor data features x, i.e., in units of the input data domain of the sensor data 10. So, for example if the fault detection model 11 is trained to classify sensor data in a time domain, $\phi$ will specify the importance of the sensor data features in the time domain, like depicted in the FIG. 3A. Sensor data features which have a high importance to the predicted failure value of the bearing are marked by dashed lines 21, sensor data features which have a low importance to the predicted failure value of the bearing are marked by dotted lines 22. The importance can also be indicated by color, wherein the value of the importance score is encoded by a color-scale and/or the intensity of the lines 21, 22. In the case where the fault detection model cares mainly about frequency information, but feature importance is displayed in the time domain, this would cause uninterpretable results and might not be meaningful to domain experts at all.

As one can see at FIG. 3A, it is very hard to infer any specific pattern or to find concrete reasons to explain the fault detection model's decision. On the other hand, see FIG. 3B, if the values of the feature importance are computed in the frequency domain providing a frequency representation of the measured sensor data, it is immediately clear that the presence of a single frequency peak, see line 31, has had a significant influence on the predicted failure value. Similar as in FIG. 3A, the value of importance in the selected data domain, here the frequency domain is coded by different structure or different color of a line at the respective frequency, see FIG. 3B.

To achieve a feature attribution in the selected domain which is different from the input data domain of the measured sensor data 10, feature attributions is translated into the selected domain by applying a bijective mapping, which captures an invertible one-to-one correspondence between the input data domain of the fault detection model 11 and the selected domain. For instance, the Fourier Transform can be considered as such kind of a mapping translating from the time domain into a frequency representation, which is also revertable.

Mathematically, a domain mapping into D is specified by a function $\varphi: R^d \to D$ which is invertible, meaning that there exists another function $\varphi^{-1}: D \to R^d$ such that $\varphi^{-1}(\varphi(x)) = x$. The domain mapping can also consist of multiple concatenated mappings with all of them being invertible. Since the goal of $\varphi$ is to translate sensor data features in the input domain into a more meaningful selected domain, we will refer to $\varphi(x) = z$ as the interpretable or semantic representation of x.

If an appropriate domain mapping function $\varphi$ is specified, it can be combined with a feature attribution method to compute feature importance values in terms of the selected domain, i.e., a semantic representation z rather than based on sensor data features x. More specifically, $\varphi$ can be used to create an augmented model $$\tilde{f}: D \to R \text{ with } \tilde{f}(z) = f(\varphi^{-1}(z)).$$

Any model agnostic feature attribution method can now be evaluated on $\tilde{f}$ instead of $f$ yielding values of importance in the selected domain. This holds true because model agnostic methods are designed to work with any machine learning model. If model specific attribution methods shall be applied one needs to check whether $\tilde{f}$ still meets necessary assumption of embodiments of the method (e.g., differentiability) or whether embodiments of the method need to be further adapted to work on such models (e.g., new LRP-rule).

Semantic Explanations for Bearing Fault Detection

Defects of bearings induce fault signals, i.e., measured sensor data, having an amplitude modulating effect on a specific carrier signal. Domain experts can detect such effects by analysing an envelope spectrum and checking whether specific fault frequencies are present. This logic is rigorously grounded on the physical understanding of bearing fault defects. If a machine learning model is trained to identify bearing faults from raw or prepossessed signals, i.e., sensor data in the input data domain, the link to existing domain knowledge about the physics of the problem might be neglected or at least unknown. This is especially true for machine learning models, especially deep neural network, which have already been demonstrated to be able to succeed in bearing fault detection tasks.

Such models might leverage any potential characteristic of the sensor data to base its decision on, and some of them might be spurious. This can lead to overfitting and could cause the model to perform bad in deployment. To prevent this from happening and to ensure trustworthy models with high prediction quality, it is necessary to validate to which extend the model follows the physically grounded routine of domain experts. More precisely, in the case of fault detection of bearings mounted in a machine, if one wants to check which features are important for the fault detection model 11 via feature attribution methods it would be ideal to get values of feature importance in terms of the frequency components of an envelope spectrum of sensor data measuring the vibration of the machine close to the bearing. This information would be immediately accessible to domain experts and would make it easy to check whether a fault detection model is in line with the physical understanding of bearing faults or not.

In the following, domain maps are provided for three common scenarios of bearing fault detection models (FD models), depending on the type of measured sensor data in the input domain used to train the obtained fault detection model 11 and which serve as input data 10 to the obtained fault detection model 11, see also Table 1 below.

First, the fault detection model 11 is trained on signal envelops in a time domain, given by the amplitude of the analytic signal, e.g., the measured sensor data. In that case, the applied domain mapping $\varphi$ is a Fourier Transform, so $$\varphi(x) = FT(x).$$

Second, the fault detection model 11 is trained on sensor data in the time domain. In order to derive the signal envelope of the sensor data from a time domain signal x it is computed via the amplitude of its analytic signal. This means that the signal envelope $x_{env}$ is mathematically given by $x_{env}=|x+iHT(x)|$, where HT resembles the Hilbert transform. The desired envelope spectrum can now be computed via $FT(x_{env})$.

The goal is to find a domain map that derives the envelope spectrum from time domain signals while being invertible. The absolute value, however, would violate the requirement. To circumvent this problem, one additionally needs to preserve the phase information of the analytic signal by computing its argument $\arg(x+iHT(x))$. This yields to a domain map $$\varphi: R^d \to C^d \times R^d \text{ with } \varphi(x) = (FT(|x + iHT(x)|), \arg(x + iHT(x)).$$

Its inverse is given by $\varphi-1(z1, z2)=IFT(z1)\cos(z2)$. This finally enables us to attain a valid semantic representation of time domain signals in terms of their envelope spectrum.

Lastly, the fault detection model 11 is trained on sensor data in the frequency domain. In this case the sensor data are first transformed using the inverse Fourier Transform into the time domain and then apply φ specified above for the mapping from the time domain into frequency domain.

The different domain mappings and their inverse transformation for different input data domains to the frequency domain as selected data domain are summarized in the table below.

TABLE 1

| FD Model input data | Domain map φ | Inverse domain map $\varphi^{-1}$ |
|---|---|---|
| Time signal envelops | $\varphi(x) = FT(x)$ | $\varphi^{-1}(z) = IFT(z)$. |
| Time domain signals | $\varphi(x) = (FT(|x + iHT(x)|), \arg(x + iHT(x))$ | $\varphi - 1(z1, z2) = IFT(z1)\cos(z2)$ |
| Frequency domain signals | $\varphi(x) = \varphi_{Time}(IFT(x))$ | $\varphi^{-1}(z) = FT(\varphi_{time}^{-1}(z_1, z_2))$ |

Such, the proposed method provides tools to evaluate how well machine learning model trained to detect bearing fault are aligned with existing conventional knowledge about the underlying physics. The domain mappings φ can be combined with existing feature attribution methods to estimate to which extend the model has utilized the presence of characteristic fault frequencies. Such information is immediately accessible to domain expert in contrast to uninterpretable importance values on the input domain, i.e., also called raw data, produced by feature attribution methods alone. This is visualized in FIG. 4.

This is visualized in FIG. 4. A fault detection model was trained on measured sensor data signal in the time domain and has detected a bearing fault in the presented signal. On the top, importance values 41, 42 of feature attributions evaluated in the time domain are depicted. Again, it is hard to infer any useful information regarding the potential reason of the predicted bearing fault. It is especially not clear whether the fault detection model is aligned with existing domain knowledge, that in case of a fault, a particular peak in the envelop spectrum should be present. However, if the feature attributions are computed based on a semantic representation, i.e., a selected data domain related to a physical explanation, see the bottom of FIG. 4, it can be verified that the fault detection model put strong emphasis on the relevant fault frequency indicated with a vertical line 46. At least one importance values indicating high importance 45 coincides with the relevant fault frequency 46, wherein the importance values indicating low importance 44 are clearly separated. This information is extreme useful to domain experts and can be used to validate or improve the fault detection model accordingly.

An embodiment of the fault detection apparatus 50 is shown in FIG. 5. The fault detection apparatus 50 comprises a data interface 51, configured to obtain sensor data measured at the bearing mounted at a machine 60 as input data. The input data relates to an input data domain. Further, a fault detection model is obtained via the data interface 51. The fault detection model is trained on sensor data related to the input data domain to output a predicted failure value of the bearing by processing the obtained sensor data. The machine 60 is a rotating machine, especially a motor, turbine, pump and press.

The fault detection apparatus 50 comprises a data mapping unit 52, configured to map the measured sensor data from the input data domain to a selected data domain resulting in an augmented fault detection model which outputs augmented predicted failure value related to the selected data domain. The selected data domain is configured such that it has a physical meaning to the fault of the bearing.

The fault detection apparatus 50 comprises a feature attribution unit 53, configured to perform a feature attribution on the augmented fault detection model quantifying an importance of at least one individual feature of the input data to the augmented failure value related to the selected data domain.

The fault detection apparatus 50 comprises a user interface 54, configured to displaying the individual feature of the input data and the respective quantified importance in the selected data domain.

It is to be understood that the above description of examples is intended to be illustrative and that the illustrated components are susceptible to various modifications. For example, the illustrated concepts could be applied for different technical systems and especially for different subtypes of the respective technical system with only minor adaptions.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for providing physically explainable fault information of a bearing built in a machine by a fault detection model, comprising the steps:

obtaining sensor data measured at the bearing as input data relating to an input data domain and the fault detection model which is trained on sensor data related to the input data domain to output a predicted failure value of the bearing by processing the obtained sensor data;

mapping the measured sensor data from the input data domain to a selected data domain and resulting in an augmented fault detection model which outputs augmented predicted failure value related to the selected data domain, wherein the selected data domain has a physical meaning to a fault of the bearing;

performing a feature attribution on the augmented fault detection model for the obtained sensor data, wherein a quantified importance of at least one individual feature of the input data to the augmented predicted failure value in the selected data domain is identified via said performing the feature attribution;

displaying the at least one individual feature and the respective quantified importance in the selected data domain at a user interface; and in response to one quantified importance of the at least one individual feature being detected at a predefined frequency that is related to a root cause of the fault of the bearing, automatically outputting an alarm to a user interface, followed by taking measures comprising changing settings of the machine, stopping the machine, performing maintenance work on the machine, or combinations thereof.

2. The computer-implemented method according to claim 1, wherein the mapping consists of multiple concatenated domain mappings.

3. The computer-implemented method according to claim 1, wherein the mapping is performed by applying an invertible, bijective transformation function onto the measured sensor data.

4. The computer-implemented method according to claim 3, wherein the mapping is performed by applying the transformation function onto the measured sensor data and by applying an inverse transformation function onto the fault detection model.

5. The computer-implemented method according to claim 1, wherein the feature attribution is performed by any model agnostic feature attribution method applicable to the fault detection model.

6. The computer-implemented method according to claim 1, wherein the sensor data is vibration data or electric current data measured at or near the bearing.

7. The computer-implemented method according to claim 1, wherein the sensor data measured at the bearing are measured in a time domain and the mapping is performed into a frequency domain.

8. The computer-implemented method according to claim 1, wherein an alarm is automatically output to the user interface, if the quantified importance of the at least one individual feature is detected at a predefined frequency, which is related to a root cause of the bearing.

9. The computer-implemented method according to claim 1, wherein the quantified importance is displayed in a color-code with respect to quantity.

10. The computer-implemented method according claim 1, wherein the fault detection mode is trained on a signal envelope of the measured sensor data in a time domain and analysed for specific fault frequencies in a frequency domain.

11. The computer-implemented method according to claim 10, wherein the mapping is performed by a Fourier transformation function.

12. The computer-implemented method according to claim 1, wherein the machine is a rotating machine selected from the group consisting of a motor, a turbine, a pump, and a press.

13. The computer-implemented method according to claim 1, wherein the fault detection model is a deep neural network.

14. The computer-implemented method according to claim 13, wherein the deep neural network is selected from the group consisting of an Autoencoder, a Convolutional Neural Network, and a Deep Belief Network.

15. The computer-implemented method according to claim 1, said method comprising:
improving the fault detection model by utilizing: (i) a coinciding of a relevant fault frequency in the selected data domain with a high quantified importance of the at least one individual feature; and (ii) a clear separation of the relevant fault frequency in the selected data domain from a low quantified importance of the at least one individual feature.

16. A computer program product, comprising a computer readable hardware storage device having computer readable program code stored therein, the program code executable by a processor of a computer system to implement a method directly loadable into the internal memory the computer system, comprising software code portions for performing the method of claim 1 when the software code is run on the computer system.

17. A fault detection apparatus for providing physically explainable fault information of a bearing built in a machine by a fault detection model, comprising at least one processor configured to perform the steps:
obtaining sensor data measured at the bearing as input data relating to an input data domain and a fault detection model which is trained on sensor data related to the input data domain to output a predicted failure value of the bearing by processing the obtained sensor data;

mapping the measured sensor data from the input data domain to a selected data domain and resulting in an augmented fault detection model which outputs augmented predicted failure value related to the selected data domain, wherein the selected data domain has a physical meaning to a fault of the bearing;

performing a feature attribution on the augmented fault detection model for the obtained sensor data, wherein a quantified importance of at least one individual feature of the input data to the augmented predicted failure value in the selected data domain is identified via said performing the feature attribution;

displaying the at least one individual feature and the respective quantified importance in the selected data domain at a user interface; and in response to one quantified importance of the at least one individual feature being detected at a predefined frequency that is related to a root cause of the fault of the bearing, automatically outputting an alarm to a user interface, followed by taking measures comprising changing settings of the machine, stopping the machine, performing maintenance work on the machine, or combinations thereof.

* * * * *